Figure 1:
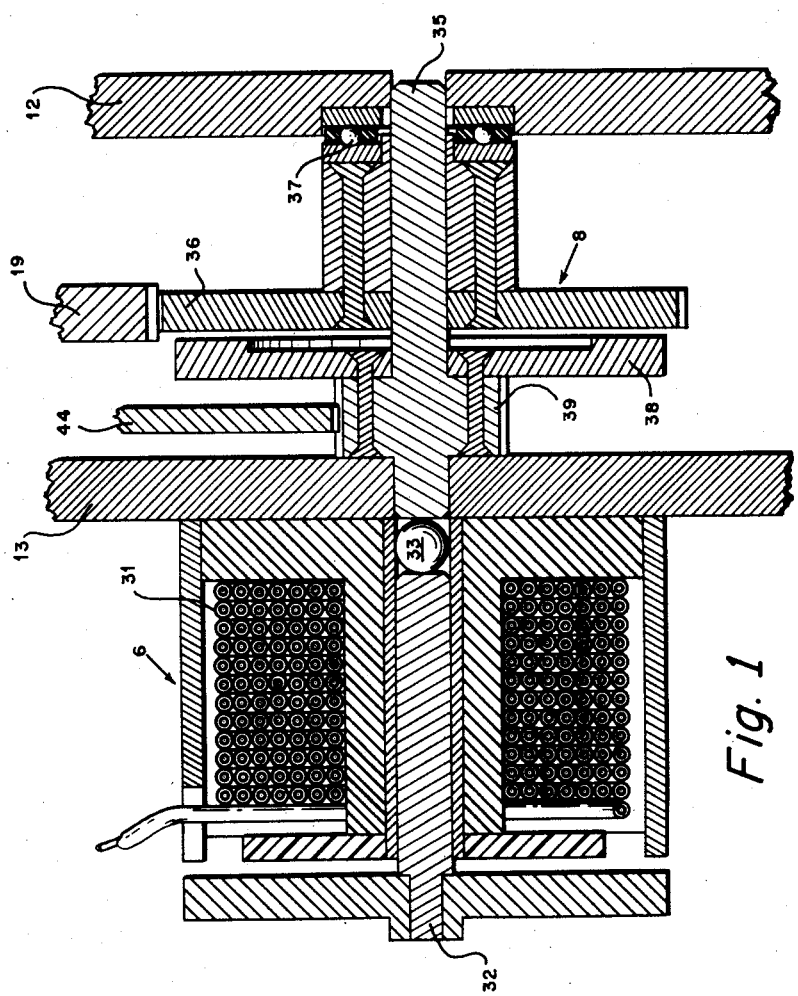

July 7, 1959 H. B. JOPSON 2,894,236
RADIO REMOTE CONTROLLER FOR AIRCRAFT
Filed Nov. 2, 1953 4 Sheets-Sheet 1

INVENTOR.
HOWARD B. JOPSON
BY
ATTORNEYS

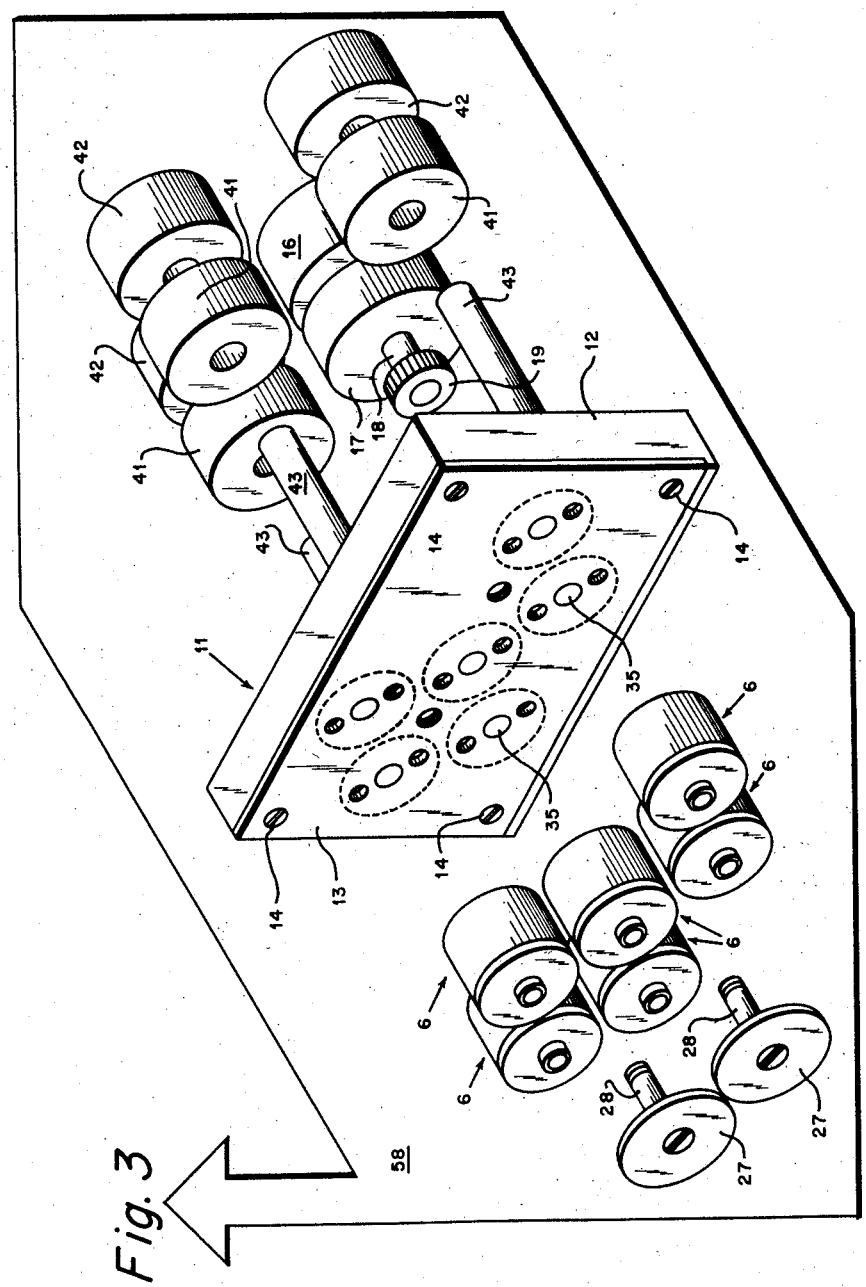

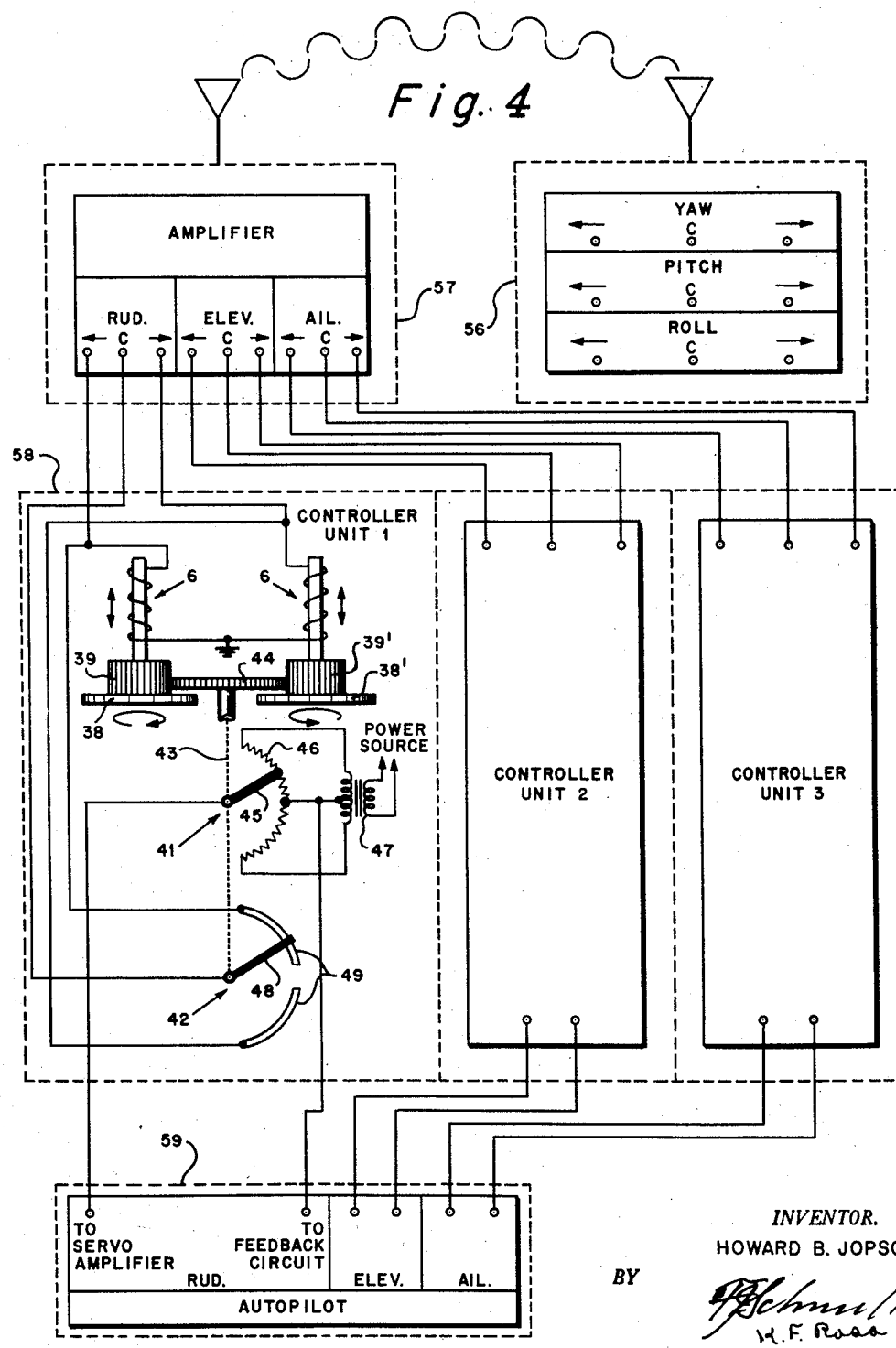

United States Patent Office 2,894,236
Patented July 7, 1959

2,894,236

RADIO REMOTE CONTROLLER FOR AIRCRAFT

Howard B. Jopson, Hatboro, Pa., assignor to the United States of America as represented by the Secretary of the Navy Application November 2, 1953, Serial No. 389,899

6 Claims. (Cl. 338—116)

(Granted under Title 35, U.S. Code (1952), sec. 266)

The invention described herein may be manufactured and used by or for the Government of the United States of America for governmental purposes without the payment of any royalties thereon or therefor.

This invention relates to a radio remote controller for aircraft and more particularly to an improved system for inserting voltage bias into the surface operating channels of an aircraft autopilot, said system being characterized by a single continuously running unidirectional drive means and a novel compound clutch assembly.

Known types of radio remote controllers currently used to regulate the autopilots in drone type aircraft include a plurality of reversible D.C. motors each of which is intermittently energized by suitable remote control means to displace a voltage biasing potentiometer mechanically connected to the motor. The efficiency of remote controllers of this type is seriously impaired by several very undesirable characteristics. They necessarily have a slow response time because of the time lag involved in first energizing a motor and then overcoming the inertia of numerous parts at rest before the potentiometer can be displaced by rotation of the motor to generate a biasing voltage. This is a very serious deficiency inasmuch as immediate response of the autopilot is frequently essential and always desirable for successful operation of drone aircraft. The second deficiency involves the characteristically broad limits of the centered position of the voltage biasing potentiometer assemblies incorporated in known types of controller units, which allow excessive latitude in returning the controller to the centered position for the purpose of returning the control surfaces of an aircraft to their respective neutral positions. This is also a serious deficiency since precise regulation of the position of the aircraft control surfaces is critical at all times during flight and particularly in operation of drone aircraft. Finally, D.C motors have inherent characteristics which result in brush troubles at high altitudes. Consequently, the reliability of remote controllers making use of such motors is uncertain, especially where high altitude operations are involved.

The instant invention contemplates the use of a three output solenoid operated reversible clutch unit which is driven by a continuously running A.C. motor, in order to overcome the disadvantage of slow response time inherent in systems employing intermittently operated D.C. motors. The present invention also provides an improved centering sector which is adjustable to approximately plus or minus ¼° as compared to adjustment to plus or minus 2° for known types of remote controllers. This arrangement provides a relatively narrow center position insuring substantially increased accuracy of the control system. Moreover, the use of a continuously running A.C. motor in the instant invention insures reliable operation over extended periods by eliminating the high altitude brush troubles inherent in D.C. motors.

An object of the present invention is the provision of an improved radio remote controller for aircraft autopilots capable of reliable operation over extended periods.

Another object of the invention is to provide a radio remote controller having a substantially accelerated rate of response to remote actuating signals.

A further object of this invention is the provision of a radio remote controller system characterized by a narrowly regulated centered position.

A final object of this invention is to provide a continuously running drive means for a radio remote controller selectively connected intermittently to a plurality of means for introducing voltage bias into an aircraft autopilot.

Figure 2:
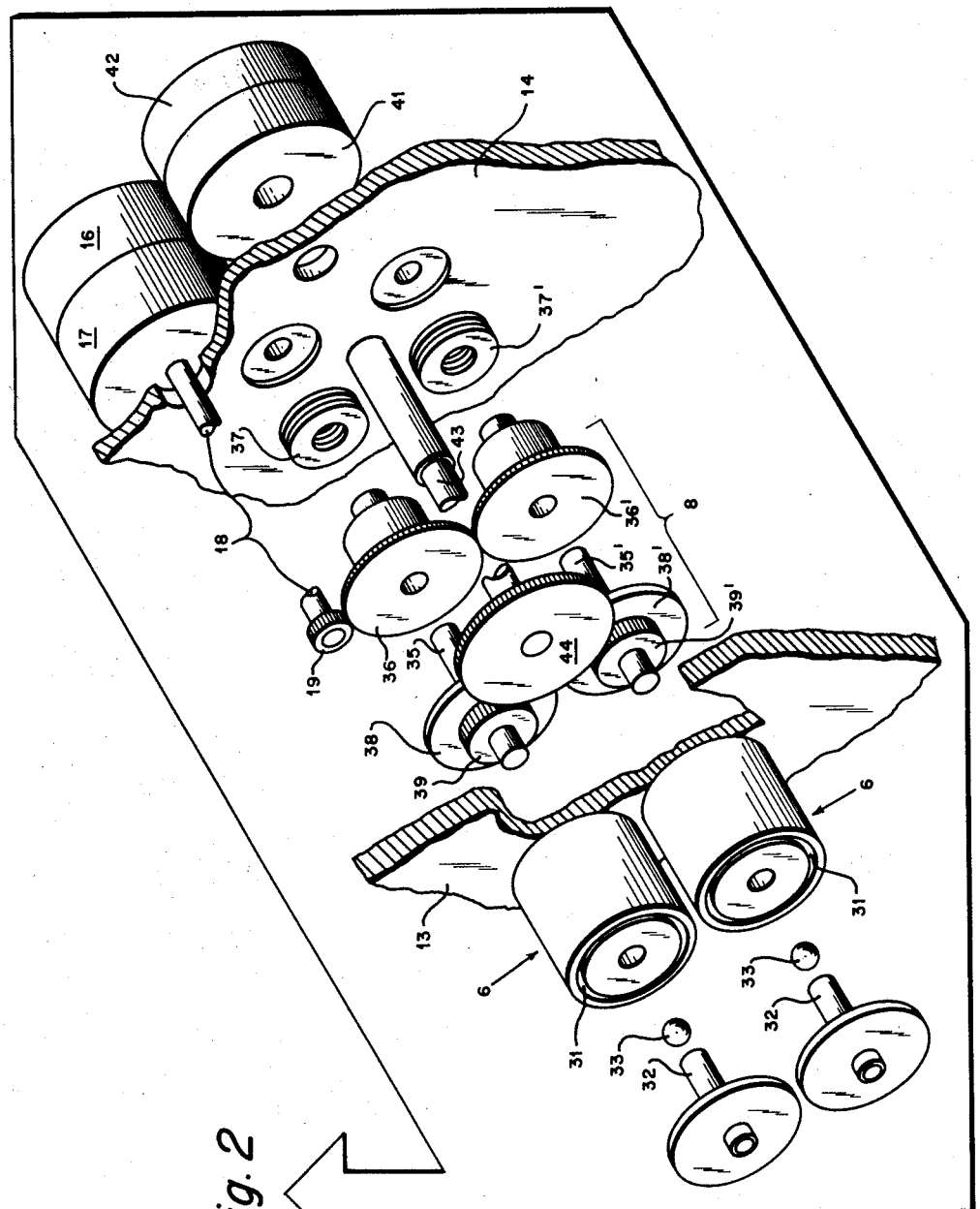

The exact nature of this invention as well as other objects and advantages thereof will be readily apparent upon consideration of the following specification along with the annexed drawings in which:

Fig. 1 is a representative longitudinal cross section partly broken away showing one clutch unit within the compound clutch assembly characterizing the instant invention, and the controlling solenoid associated therewith, Fig. 2 is a schematic exploded view partly broken away showing a representative pair of clutch units and their operating relation with the continuously running drive motor and with the potentiometer unit controlled thereby, Fig. 3 is an exploded schematic representation of the entire compound clutch assembly incorporated in the instant invention, and Fig. 4 is a diagrammatic representation of the entire radio remote controller comprising the instant invention.

Referring now to the drawings, wherein like reference numerals designate like or corresponding parts throughout the several views, there is shown in Fig. 1 a detailed view typical of the plurality of solenoid operated quick acting clutch units incorporated in the compound clutch assembly characterizing the instant invention. The solenoid assembly 6 includes a winding 31 arranged to cause longitudinal movement of the armature 32 to the right, as seen in Fig. 1, whenever the winding 31 is energized. This movement of the armature 32 is transmitted to the clutch assembly 8 through the ball 33 and the clutch supporting shaft 35. The shaft 35 is arranged to support an input gear 36 and an adjacent thrust bearing 37, both of which are freely movable, both longitudinally and rotatably, relative to shaft 35. The shaft 35 also supports a clutch plate 38 and an adjacent gear 39, both of which are fixed, both longitudinally and rotatably, relative to shaft 35. Hence, longitudinal movement of the shaft 35 to the right as shown in Fig. 1 brings the clutch plate 38 into contact with the face of input gear 36, since gear 36 is restrained against movement to the right, as seen in Fig. 1, by the thrust bearing 37.

Since the input gear is continuously driven in one direction by a drive gear 19, engagement of the clutch plate 38 with the face of gear 36 produces immediate rotational movement of the clutch plate 38 and the attached gear 39 which is transmitted to a driven gear 44 continuously enmeshed with gear 39.

Solenoid operated quick acting clutch units of the type described above in relation to Fig. 1 may be arranged in pairs to form a reversible clutch mechanism in the manner indicated in the simplified showing in Fig. 2. First and second clutch units are located on parallel axes so that the input gear 36 of the first clutch assembly 8 is enmeshed with input gear 36' of the second clutch assembly 8. With this arrangement, gears 36 and 36' are continuously driven in opposite directions by a single drive gear 19. The clutch plates 38 and 38' are of relatively reduced diameters, as indicated most clearly in Fig. 1, so that they are free to rotate in either direction simultaneously. The gears 39 and 39' of the respective clutch units are so disposed that they are both in continuous operable engagement with the same driven gear 44. Consequently, when neither solenoid is energized the driven gear 44 is motionless despite the fact that input gears 36 and 36' are rotating in opposite directions. When the solenoid of the first clutch unit is energized, the clutch plate 38 is moved into engagement with the input gear 36 and driven gear 44 is immediately rotated in the same direction as gear 36'. When the solenoid of the second clutch unit is energized, the clutch plate 38' is moved into engagement with the input gear 36' and driven gear 44 is immediately rotated in the same direction as gear 36. With both clutch assemblies 8 continuously enmeshed with the driven gear 44, only one of their associated solenoids should be energized at a time. Accordingly, the control circuits for the respective solenoids of the reversible clutch mechanism may be arranged so that energization of either solenoid interrupts the circuit by which the other solenoid is energized.

A plurality of such reversible clutch mechanisms may be combined to form a compound clutch assembly for use with a single driving means. For example, three reversible clutch mechanisms each comprising a pair of clutch units arranged as shown in Fig. 2, may be grouped around a single drive gear 19 in the manner shown in Fig. 3 to provide a compact rapidly acting multiple clutch assembly with a single continuously operating driving means, particularly well adapted for use as an improved remote controller for an aircraft autopilot. The clutch housing assembly 11 includes the relatively flat rectangular clutch housing 12 and the flat clutch housing cover plate 13 attached thereto by suitable fastening means 14. The single driving mechanism includes a drive motor 16 connected through a gear train contained in the gear box 17 to a drive shaft 18 upon which drive gear 19 is fixedly secured. The gear box 17 and the drive motor 16 attached thereto are externally mounted centrally of the clutch housing 12 with the drive shaft 18 projecting through the housing to support the drive gear 19 within the clutch housing assembly 11. The three potentiometer assemblies 41 and their respective associated centering switch assemblies 42 are mounted on the outer surface of the clutch housing 12 at spaced intervals around the driving mechanism. Each potentiometer has a conventional wiper arm positioned angularly by a potentiometer shaft 43 projecting from the clutch housing 12. Since the driven gears 44, hereafter referred to as the potentiometer gears are fixedly secured to the ends of the respective potentiometer shafts 43, as shown in Fig. 2 the continuous rotary motion of the drive gear 19 is selectively transmitted to one or more of the potentiometer shafts 43 through the respective clutch assemblies 8 in the manner described in detail above in relation to the showing in Fig. 2.

The six solenoid assemblies 6, grouped in pairs as indicated, are mounted upon the outer surface of the cover plate 13 by suitable fastening means not shown. The circular plates 27, secured fixedly to the cover plate 13 by threaded pins 28, are arranged to retain the armature 32 within the respective solenoid assemblies 6.

The relationship between each potentiometer 41 and its associated centering switch 42 can best be understood upon the basis of the showing in Fig. 4. The wiper arm 45 of the potentiometer 41 and the rotating contact 48 of the centering switch 42 are both fixedly secured to the potentiometer shaft 43 in identical angular relation to the shaft. The significance of this relationship will become apparent upon consideration of the following detailed description of the operation of the instant invention, based upon the showing in Fig. 4.

Fig. 4 is a diagrammatic representation of a novel radio remote controller system for an aircraft autopilot incorporating the rapidly acting multiple clutch assembly 58 which includes the entire showing in Fig. 3. Actuation of a selected keying means on the control panel of the transmitter assembly 56, for example, the left hand directional button on the "yaw" portion of the control panel 56, results in transmission of a suitable signal to the receiver assembly 57 where it is amplified and directed through the corresponding "left" electrical circuit to one of the two solenoid assemblies in the controller unit 1 of the clutch assembly 58 which is arranged to control movements of the rudder of an aircraft. As noted above, in the description relative to Figs. 1 and 2, energization of the winding in the solenoid assembly 6 causes longitudinal movement of the armature thereof, to bring the clutch plate 38 into engagement with the face of an input gear 36, shown in Fig. 2. Rotation of the clutch plate 38 is transmitted through the gear 39 and the potentiometer gear 44 to the shaft 43. As the shaft 43 is rotated the attached wiper arm 45 of the potentiometer 41 is moved angularly along the potentiometer resistance 46 away from a centered position in which the potentiometer produces a null signal. As the wiper arm 45 is moved the electrical energy transmitted to the potentiometer 41 through the transformer 47 from a suitable power source produces a corresponding controlling signal for transmission to an autopilot assembly 59. The sense and magnitude of the signal thus produced is a function of the position of the wiper arm 45 upon the resistance 46.

In order to provide remotely controlled means for restoring each controller unit to a centered or neutral position after a signal has been imposed thereon in the manner described above, a centering switch 42 is mounted adjacent each potentiometer 41 with its angularly movable contact arm 48 attached to shaft 43 for movement coincident with that of the wiper arm 45. Thus, when the wiper arm 45 is displaced from a centered position by rotation of shaft 43 the contact arm 48 is likewise displaced so that it is brought into engagement with one of the peripheral contacts 49. When this condition exists, actuation of the centering button "c" on the "yaw" portion of the control panel as shown in Fig. 4 energizes the circuit including the centering switch 42 and the solenoid assembly 6 which will move clutch plate 38' into engagement with the input gear 36' shown in Fig. 2 to produce reverse rotation of the shaft 43. When the contact arm 48 reaches its central position, the circuit through the centering switch is interrupted and hence the reverse rotation ceases with the wiper arm 45 in its centered position.

Actuation of the right hand directional button on the "yaw" portion of the control panel 56, followed by actuation of the centering button, produces a cycle of operation identical to that described above, except that the sequence in which the two solenoid assemblies 6 of controller unit 1 are energized is reversed, with the result that the potentiometer wiper arm 45 is initially moved angularly in the opposite direction and then reversed to return it to its centered position.

Since the configuration of controller units 2 and 3 is identical to that of controller unit 1, the details of these units have not been shown in Fig. 4. Moreover, since the operation of controller unit 1 is representative of all three units, their operation will not be described in detail. In addition, it should be noted that each of the three controller units may be operated independent of the operation of any other controller unit. Hence, two or more of the voltage biasing potentiometers of the respective controller units may be driven in either direction simultaneously to produce the desired cumulative effect upon an autopilot controlled by the device comprising the instant invention.

Hence, the instant invention provides a compact and reliable system for rapid and accurate control of aircraft autopilots particularly useful for the operation of drone type aircraft.

It should be understood, of course, that the foregoing disclosure relates particularly to a preferred embodiment of the invention and that numerous modifications and alterations may be made therein without departing from the spirit and scope of the invention as set forth in the appended claims.

What is claimed is:

1. A remote controller unit for use in directing the flight of drone aircraft, including a continuously running drive motor, at least one potentiometer arranged to insert voltage bias into a surface operating channel of an autopilot, at least one centering switch connected to and movable with said potentiometer at least one reversible clutch mechanism to selectively transfer the rotary motion of said motor to said potentiometer, a first solenoid control means arranged to actuate said clutch mechanism to produce rotation of said potentiometer in one direction, a second solenoid control means arranged to actuate said clutch mechanism to produce rotation of said potentiometer in the other direction, and a centering control means arranged to actuate said clutch mechanism to produce rotation of said potentiometer to a centered position, whereby a remotely generated actuating signal is effective through the selected solenoid, the clutch mechanism and the potentiometer to introduce the desired sense and magnitude of voltage bias into a surface operating channel of an autopilot, and a remotely generated centering signal is effective through the clutch mechanism to return the potentiometer to a centered null position.

2. A controller for inserting voltage bias into the control surface operating channels of an autopilot, comprising a continuously rotating uni-directional drive-gear, a continuously running drive motor operatively connected to said drive gear, a first given plurality of input gears enmeshed with said drive gear and continuously rotated thereby in one direction, a second equal plurality of input gears enmeshed with respective input gears of the first plurality and continuously rotated thereby in the opposite direction, a first equal plurality of clutch plates respectively rotatably mounted coaxially with said first plurality of input gears for sliding movement into and out of engagement therewith, a second equal plurality of clutch plates respectively rotatably mounted coaxially with said second plurality of input gears for sliding movement into and out of engagement therewith, first and second equal pluralities of clutch gears each coaxial with and fixedly attached to one of the respective clutch plates of said first and second pluralities thereof, an equal plurality of potentiometer gears each disposed in continuous engagement with two clutch gears connected to clutch plates coaxial with mutually enmeshed input gears of the first and second pluralities thereof, respectively, an equal plurality of potentiometers each including a rotatable shaft connected to one of the potentiometer gears for rotation therewith, an equal plurality of centering switches each mounted coaxially with a potentiometer and connected to the shaft thereof for movement therewith, and first and second equal pluralities of solenoids each independently responsive to a selected remotely controlled actuating signal to move one of said clutch plates into engagement with one of said input gears for substantially instantaneous rotation therewith, to effect the desired magnitude and direction of displacement of the potentiometer controlled thereby from a centered position and alternatively independently responsive to a remotely controlled centering signal effective through said centering switch to return the potentiometer controlled thereby to a centered position.

3. A controller for inserting voltage bias into the control surface operating channels of an autopilot, comprising a continuously rotating uni-directional drive gear, a continuously running drive motor operatively connected to said drive gear, a first set of three input gears enmeshed with said drive gear and continuously rotated thereby in one direction, a seond set of three input gears enmeshed with respective input gears of the first set and continuously rotated thereby in the opposite direction, a first set of three clutch plates respectively mounted coaxially with said first set of input gears for sliding movement into and out of engagement therewith, a second set of three clutch plates respectively rotatably mounted coaxially with said second set of input gears for sliding movement into and out of engagement therewith, a set of six clutch gears each coaxial with and connected to one of the respective clutch plates of said first and second sets thereof, a set of three potentiometer gears each disposed in continuous engagement with two clutch gears connected to clutch plates coaxial with mutually enmeshed input gears of the first and second set thereof, respectively, a set of three potentiometers each including a rotatable shaft connected to one of the potentiometer gears for rotation therewith, a set of six solenoids each independently responsive to a selected remotely controlled actuating signal to move one of said clutch plates into engagement with one of said input gears to produce immediate rotation in one direction of the rotatable shaft of one potentiometer, and a set of three centering switch assemblies each mounted adjacent one of said potentiometers and connected to the shaft thereof for rotation therewith, each said centering switch assembly being effective in response to a remotely controlled centering signal to energize a solenoid to produce centering rotation of a potentiometer.

4. A remote controller system for use in directing the flight of drone aircraft, including a single continuously running drive means, a plurality of voltage biasing means selectively movable in opposite directions, a selectively operable compound coupling means operably connected to said drive means and to the respective voltage biasing means, said coupling means having a plurality of individually actuated oppositely acting paired components for selectively interconnecting said drive means with each of said voltage biasing means for movement in one of two opposite directions, a plurality of paired remotely actuated control means selectively operated to actuate the corresponding paired components of said coupling means, and a plurality of centering means for said voltage biasing means movable with said voltage biasing means and operatively connected to said remotely actuated control means for centering said voltage biasing means.

5. A remote controller unit for use in directing the flight of drone aircraft including a single continuously running drive motor, a plurality of potentiometers arranged to insert voltage bias into the control surface operating channels of an autopilot, a corresponding plurality of reversible clutch mechanisms all in continuous operative engagement with said motor and each arranged to selectively transfer the rotary motion of said motor to one of the potentiometers, each said clutch mechanism comprising first and second clutch units, each unit including an input gear and a clutch plate assembly adjacent thereto, the input gear of the first clutch unit being disposed in engagement with a gear connected to said drive motor for rotation in one direction and the input gear of the second clutch unit being disposed in engagement with the input gear of the first clutch unit for rotation in the opposite direction, the clutch plate assemblies of the first and second clutch units each being in continuous engagement with a gear connected to the potentiometer controlled by said first and said second clutch units and being movable into and out of engagement with their respective input gears, a plurality of first solenoid control means each arranged to control the clutch plate assembly of one of said first clutch units to produce rotation of one potentiometer in one direction, a plurality of second solenoid control means arranged to control the movement of the clutch plate assembly of one of said second clutch units to produce rotation of one potentiometer in the other direction, and a plurality of centering switches each mounted coaxially with and operatively connected to a potentiometer for angular displacement therewith and operatively connected with the first and second solenoid control means associated with said potentiometer, to produce rotation of the potentiometer to a centered or neutral position at which the centering switch is opened to de-energize the solenoid control means.

6. A controller for inserting voltage bias into the control surface operating channels of an autopilot, comprising a solenoid actuated reversible clutch assembly, three pairs of actuating solenoids each operable in response to a selected signal, three potentiometers driven by said clutch assembly arranged to produce voltage biasing signals corresponding in sense and magnitude to the direction and degree of angular movement, respectively, of the potentiometer, three centering switches each connected to a potentiometer for angular displacement therewith and operatively connected with the pair of actuating solenoids arranged to produce angular displacement of said potentiometer, and a continuously running motor arranged to drive said clutch assembly, whereby a selected actuating signal is effective through the corresponding actuating solenoid and the portion of the clutch assembly actuated thereby to produce rotation of a potentiometer in the proper direction and to the proper angular position to produce the desired voltage bias, and a centering signal is effective through the centering switch controlled thereby to energize the proper solenoid to produce rotation of the potentiometer controlled thereby to a centered position at which the centering switch is opened to de-energize the solenoid.

References Cited in the file of this patent

UNITED STATES PATENTS

| | | |
|---|---|---|
| 2,156,033 | Sloan | Apr. 25, 1939 |
| 2,425,733 | Gille | Aug. 19, 1947 |
| 2,452,311 | Markusen | Oct. 26, 1948 |
| 2,493,059 | Crafts | Jan. 3, 1950 |
| 2,510,707 | Markusen | June 6, 1950 |
| 2,642,554 | MacCallum | June 16, 1954 |
| 2,692,356 | Milsom | Oct. 19, 1954 |
| 2,793,335 | Woodruff | May 21, 1957 |